United States Patent
Li et al.

(10) Patent No.: US 11,118,126 B2
(45) Date of Patent: Sep. 14, 2021

(54) COLD FLOW ADDITIVE FOR MIDDLE DISTILLATE FUELS

(71) Applicant: Ecolab USA Inc., St. Paul, MN (US)

(72) Inventors: Xiaojin Harry Li, Palatine, IL (US); Nestor U. Soriano, Jr., Missouri City, TX (US); Heinrich Bode, Aurora, IL (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 16/506,049

(22) Filed: Jul. 9, 2019

(65) Prior Publication Data

US 2020/0017786 A1 Jan. 16, 2020

Related U.S. Application Data

(60) Provisional application No. 62/696,512, filed on Jul. 11, 2018.

(51) Int. Cl.
*C10L 1/195* (2006.01)
*C08F 2/06* (2006.01)
(Continued)

(52) U.S. Cl.
CPC .......... *C10L 1/195* (2013.01); *C08F 2/06* (2013.01); *C08F 8/12* (2013.01); *C08F 8/32* (2013.01);
(Continued)

(58) Field of Classification Search
CPC ...... B01D 17/047; C09K 15/20; C09K 15/26; C09K 8/54; C10G 2300/1059;
(Continued)

(56) References Cited

U.S. PATENT DOCUMENTS 4,121,026 A 10/1978 Cheng et al.
4,211,534 A 7/1980 Feldman
(Continued)

FOREIGN PATENT DOCUMENTS

AU 2012351671 A1 7/2014
EP 1380635 A2 1/2004
(Continued)

OTHER PUBLICATIONS

Ke-Jian et al., "A study on three kinds of alcohols esterified copolymer of maleic anhydride and olefins as pour-point depressant for diesels", Petroleum Science and Technology, vol. 16, Issue No. 9-10, Oct.-Nov. 1998, pp. 971-977.
(Continued)

*Primary Examiner* — Latosha Hines
(74) *Attorney, Agent, or Firm* — Kagan Binder, PLLC (57) ABSTRACT

Disclosed are cloud point depressants and methods of making and using them. The disclosed cloud point depressants comprise copolymers of an unsaturated anhydride polymerized with alkyl α-olefins and then contacted with a phenyl alkyl alcohol or alkyl phenol alkoxylate, fatty alcohol and primary or secondary fatty amine to provide a cloud depressant reaction product. When the disclosed reaction products are added to middle distillate fuels or blends of middle distillate fuels with biodiesel, the cloud point depressants inhibit the precipitation of waxes and/or biowaxes in the fuels and the fuels exhibit reduced precipitation, gelling, and/or crystallization when subjected to low or cold temperatures.

19 Claims, 7 Drawing Sheets (51) Int. Cl.
*C10L 10/16* (2006.01)
*C08F 8/12* (2006.01)
*C08F 8/32* (2006.01)
*C08F 210/14* (2006.01)
*C08F 222/06* (2006.01)

(52) U.S. Cl.
CPC .......... *C08F 210/14* (2013.01); *C08F 222/06* (2013.01); *C10L 10/16* (2013.01); *C10L 2200/0438* (2013.01)

(58) Field of Classification Search
CPC .......... C10G 2300/304; C10G 2300/80; C10G 2400/04; C10G 31/08; C10G 33/04; C10L 10/04; C10L 10/16; C10L 1/236; C10L 2200/0438; C10L 2200/0446; C10L 2270/026; C10L 1/195; C23F 11/149; C08F 2/06; C08F 8/12; C08F 8/32; C08F 210/14; C08F 222/06
See application file for complete search history.

(56) References Cited

U.S. PATENT DOCUMENTS

| | | | |
|---|---|---|---|
| 4,731,095 | A | 3/1988 | Garapon et al. |
| 4,900,331 | A | 2/1990 | Le |
| 4,900,332 | A | 2/1990 | Denis et al. |
| 5,441,545 | A | 8/1995 | Lewtas et al. |
| 5,707,943 | A | 1/1998 | Covitch |
| 5,851,429 | A | 12/1998 | Magyar |
| 6,143,043 | A | 11/2000 | Botros |
| 7,041,738 | B2 | 5/2006 | Krull et al. |
| 2002/0040546 | A1 | 4/2002 | Botros |
| 2003/0104943 | A1 | 6/2003 | Lennon et al. |
| 2003/0166811 | A1 | 9/2003 | Peiffer et al. |
| 2005/0050792 | A1 | 3/2005 | Corkwell et al. |
| 2005/0086855 | A1 | 4/2005 | Tack et al. |
| 2007/0161519 | A1* | 7/2007 | Cravey .................. C10L 10/14 508/287 |
| 2012/0264662 | A1* | 10/2012 | DiBiase ............... C10M 145/08 508/178 |
| 2013/0025189 | A1 | 1/2013 | Burgazli et al. |
| 2015/0113859 | A1 | 4/2015 | Voelkel et al. |
| 2015/0113867 | A1 | 4/2015 | Voelkel et al. |
| 2015/0284495 | A1 | 10/2015 | Reed et al. |
| 2016/0115369 | A1* | 4/2016 | Soriano, Jr. ............ C09K 8/524 507/90 |
| 2016/0257879 | A1 | 9/2016 | Huang et al. |
| 2017/0130153 | A1 | 5/2017 | Peretolchin et al. |
| 2018/0086862 | A1 | 3/2018 | Kundu et al. |
| 2018/0025169 | A1 | 9/2018 | Mezger et al. |
| 2019/0203135 | A1 | 7/2019 | Soriano, Jr. et al. |

FOREIGN PATENT DOCUMENTS

| | | |
|---|---|---|
| WO | 2013087701 A1 | 6/2013 |
| WO | 2017/009208 A1 | 1/2017 |

OTHER PUBLICATIONS

Mariella et al., "A Novel SN1 Displacement: The Reaction of Tertiary Amines with Acetic Anhydride", Department of Chemistry, Loyola University, Chicago, Illinois, Sep. 3, 1970, pp. 3348-3351.
Pasquali et al., "Some considerations about the hydrophilic-lipophilic balance system", International Journal of Pharmaceutics, vol. 356, Issue Nos. 1-2, May 22, 2008, pp. 44-51.
International Search Report for International Application No. PCT/US2019/040944, dated Sep. 25, 2019, 5 pages.
Written Opinion for International Application No. PCT/US2019/040944, dated Sep. 25, 2019, 5 pages.

* cited by examiner

COLD FLOW ADDITIVE FOR MIDDLE DISTILLATE FUELS

CROSS-REFERENCE TO RELATED APPLICATIONS

This application claims the benefit of U.S. Provisional Application Ser. No. 62/696,512, filed Jul. 11, 2018, entitled "COLD FLOW ADDITIVE FOR MIDDLE DISTILLATE FUELS", the entire disclosure of which is incorporated herein by reference.

BACKGROUND

Cold flow additives are used to alter the low temperature properties of middle distillate fuels. An example of a cold flow additive is a cloud point depressant. In the petroleum industry, cloud point refers to the temperature below which wax in middle distillate fuels as well as wax and biowax in middle distillate fuels blended with biodiesel start to come out of solution and imparts certain degree of cloudiness or haziness to the fuels or fuels blended with biodiesel. The wax and biowax in these fuels can form a cloudy appearance at low and cold operating temperatures. The presence of solidified waxes thickens the fuel and may clog fuel filters and injectors in diesel engines. The waxes also accumulate on cold surfaces (producing, for example, pipeline or heat exchanger fouling) and form an emulsion with water. Therefore, cloud point indicates the tendency of the fuel to plug filters or small orifices at cold operating temperatures.

Cloud point depressants (CPD) have been used for many years in middle distillate fuels such as, for example, low-sulfur diesel fuels. Custom-designed, specialty polymer chemistry has enabled refiners to meet cloud point (CP) guidelines while using substantially less kerosene to meet similar levels. These polymers allow greater refined yields through cut-point adjustment upgrades and the potential for diverting kerosene to other opportunities such as, for example, jet fuel. The practice of cut-point downgrades to gas oil can be costly because diesel fuel generally has greater value. Kerosene dilutions have historically been as high as 30%-40% by volume with low-sulfur diesel fuels. While kerosene addition enables fuels to reach CP guidelines, it may negatively impact the fuel's energy content, cetane number, lubricity, flash point and density. Properly designed CPD are able to substantially reduce or even eliminate the need for kerosene, thus substantially reducing refinery costs.

With ultra-low-sulfur diesel fuels (ULSD), for example, being mandated throughout the mass market distribution system, the need for CP control is high. However, waxy crude oil and process limitations may make it difficult for refiners to economically make middle distillate fuels or blends of these fuels with biodiesel with a low cloud point. Fortunately, CPD can overcome these limitations without negatively impacting fuel characteristics. CPD allow refiners to meet low-temperature objectives while being neutral or beneficial to most other fuel properties.

SUMMARY

This disclosure provides a cold flow additive for distillate fuels comprising a reaction product of an alkyl α-olefin, an unsaturated anhydride, a phenyl alkyl alcohol or an alkyl phenol alkoxylate, a fatty alcohol, and a primary or secondary fatty amine that lowers cloud point temperatures.

One embodiment of this disclosure is a cold flow additive for middle distillate fuel comprising a solvent and a reaction product comprising an alkyl α-olefin, an unsaturated anhydride, a phenyl alkyl alcohol or an alkyl phenol alkoxylate, a fatty alcohol, and a primary or secondary fatty amine that lowers cloud point temperatures.

In some embodiments of this disclosure the ratio of maleic anhydride/α-olefin may be in the range of 0.5/2.0 to 2.0/0.5, the ratio of maleic anhydride/fatty alcohol may be in the range of about 10/1 to 1.0/1.9, the ratio of maleic anhydride/aromatic alcohol may be in the range of about 10/1 to 1.0/1.9, or the ratio of maleic anhydride/amine may be in the range of about 1.0/0.1 to 1.0/0.9.

In another embodiment of the disclosure is a reaction product prepared by a process comprising heating a mixture of an α-olefin and an unsaturated anhydride in a solvent to form an intermediate polymer, contacting the intermediate polymer with a phenyl alkyl alcohol or an alkyl phenol alkoxylate, a fatty alcohol and a fatty amine to form the reaction product.

In each of these embodiments, the alkyl α-olefin may be $C_{10}$-$C_{40}$ α-olefin, $C_{10}$-$C_{30}$ α-olefin or a $C_{20+}$ α-olefin, the unsaturated anhydride may be maleic anhydride, six-membered cyclic anhydride, or seven-member cyclic anhydride, the phenyl alkyl alcohol may be benzyl alcohol, 3-phenyl-1-propanol, or 2-phenyl alcohol, the alkyl phenol alkoxylate may be ethoxylated alkyl phenol, propoxylated alkyl phenol, ethoxylated and propoxylated alkyl phenol, ethoxylated nonylphenol, ethoxylated octylphenol or phenolglycol, the fatty alcohol may be $C_{10}$-$C_{40}OH$, $C_{10}$-$C_{30}OH$, $C_{12}$-$C_{18}OH$ or $C_{14}OH$, and the fatty amine is $C_{10}$-$C_{30}$ fatty amines, a mixture of $C_{12}$-$C_{18}$ amines, or $C_6$-$C_{30}$ aromatic amines.

In some embodiments, the solvent may be heavy aromatic naphtha, refined petroleum solvent, xylene, toluene, kerosene, hydrotreated light distillate hydrocarbon, or middle distillate hydrocarbon.

In certain embodiments of this disclosure, the cold flow additive comprises components where the solvent is heavy aromatic naphtha, the alkyl α-olefin is $C_{20+}$ α-olefin, the cyclic anhydride is maleic anhydride, the phenyl alkyl alcohol is benzyl alcohol, the fatty alcohol is $C_{14}OH$, and the fatty amine is mixture of $C_{12}$-$C_{18}$ primary or secondary amines.

Yet another embodiment of the disclosure is a process of preparing a cold flow additive comprising the steps of 1) heating a mixture of an alkyl α-olefin and an unsaturated anhydride in a solvent to form an intermediate polymer, 2) contacting the intermediate polymer with a mixture of a phenyl alkyl alcohol or an alkyl phenol alkoxylate, a fatty alcohol and a fatty primary or secondary amine to form an intermediate mixture, and 3) heating the intermediate mixture to form the reaction product. In selected embodiments, the alkyl α-olefin and unsaturated anhydride are heated in the presence of an initiator such as, for example, t-butyl peroxybenzoate. In other embodiments, the mixture of alkyl α-olefin and unsaturated anhydride are heated to a temperature of about 135° C. for about 2-3 hours while adding the initiator and maintaining a temperature of less than 150° C. Similar to the components listed above, the alkyl α-olefin is a $C_{10}$-$C_{40}$ α-olefin, $C_{10}$-$C_{30}$ α-olefin or a $C_{20+}$ α-olefin, the unsaturated anhydride is maleic anhydride, six-membered cyclic anhydride, or seven-member cyclic anhydride. In other embodiments, the phenyl alkyl alcohol or the alkyl phenol alkoxylate, a fatty alcohol and a primary or secondary fatty amine is heated at a temperature of about 145-155° C. for about 4 hours. Similar to the components listed above, the phenyl alkyl alcohol is benzyl alcohol, 3-phenyl-1-propanol, or 2-phenyl alcohol, the fatty alcohol is $C_{10}$-$C_{40}OH$, $C_{10}$-$C_{30}OH$, $C_{12}$-$C_{18}OH$ or $C_HOH$, and the primary or secondary fatty amine is $C_{10}$-$C_{30}$ fatty amines, a mixture of $C_{12}$-$C_{18}$ amines, or $C_6$-$C_{30}$ aromatic amines.

In still another embodiment, the disclosed process further comprises the steps of cooling the reaction product and adding solvent to the cooled reaction product to form a cold flow additive for middle distillate fuel where the solvent is, for example, heavy aromatic naphtha, refined petroleum solvent, xylene, toluene, kerosene, hydrotreated light distillate hydrocarbon, or middle distillate hydrocarbon.

Additional advantages and novel features of the invention will be set forth in part in the description that follows, and in part will become apparent to those skilled in the art upon examination of the following, or may be learned through routine experimentation upon practice of the invention.

DETAILED DESCRIPTION

Although the present disclosure provides different embodiments, persons skilled in the art will recognize that changes may be made in form and detail without departing from the spirit and scope of disclosed embodiments. Various embodiments may be described in detail with reference to related figures. The disclosed embodiments do not limit the scope of the attached claims. Additionally, any disclosed examples are not intended to be limiting and merely provide some of the many possible embodiments for the claims.

Unless otherwise defined, all technical and scientific terms have the same meaning as commonly understood by one of ordinary skill in the art. In case of conflict, the present document, including definitions, controls. Preferred methods and materials are described below, although methods and materials similar or equivalent to those described may be used in practice or testing of the disclosed embodiments. All publications, patent applications, patents and other references mentioned herein are incorporated by reference in their entirety. The materials, methods, and examples disclosed herein are illustrative only and not intended to be limiting.

Any recited ranges of values contemplate all values within the range and are to be construed as support for claims reciting any sub-ranges having endpoints which are real number values within the recited range. By way of a hypothetical illustrative example, a disclosure in this specification of a range of from 1-5 shall be considered to support claims to any of the following ranges: 1-5; 1-4; 1-3; 1-2; 2-5; 2-4; 2-3; 3-5; 3-4; and 4-5.

Definitions

The term "about" modifying, for example, the quantity of an ingredient in a composition, concentration, volume, process temperature, process time, yield, flow rate, pressure, and like values, and ranges thereof, employed in describing the embodiments of the disclosure, means variations in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the appended include equivalents to these quantities. Further, where "about" is used describe a range of values, for example "about 1-5" the recitation means "1-5" and "about 1 to about 5" and "1 to about 5" and "about 1 to 5" unless specifically limited by context.

The term "cloud point" (CP) means the first appearance of haze in a fuel, such as diesel fuel, due to wax crystal formation under prescribed cooling conditions. CP may be measured, for example, manually according to ASTM Method D2500 ASTM Standard D2500, Standard Test Method for Cloud Point in Petroleum Products, West Conshohocken, Pa.: ASTM International, 1999 (2011), but there are a number of automated methods that correlate to D2500 such as, for example, ASTM Standard D5773, Standard Test Method for Cloud Point of Petroleum Products (Constant Cooling Rate Method), West Conshohocken, Pa.: ASTM International. The presence of wax crystals thickens the fuel and may clog fuel filters and injectors in diesel engines. The wax also accumulates on cold surfaces and forms an emulsion with water. An everyday example of cloud point can be seen in olive oil stored in cold weather. Olive oil begins to solidify at around 4° C. (winter temperatures in temperate countries can often be colder than 0° C.). In these conditions, olive oil begins to develop white, waxy clumps of solidified oil that sink to the bottom of the container.

The term "cloud point depressant (CPD)" means a reaction product that inhibits wax precipitation, crystallization and/or gelling from fuel, and is generally applicable for diesel fuels that are Grade No. 2; a blend of Grade No. 2 and Grade No. 1; and diesel/biodiesel blends.

The terms "comprise(s)", "include(s)", "having", "has", "can", "contain(s)", and variants thereof are open-ended transitional phrases, terms, or words that do not preclude the possibility of additional acts or structures. The singular forms "a", "and", and "the" may include plural references unless the context clearly dictates otherwise. The present disclosure also contemplates other embodiments "comprising", "consisting of", and "consisting essentially of", the disclosed embodiments or elements, whether explicitly set forth or not. Further, the phrase "consisting essentially of" includes the effect of this transitional phrase to leave the claim open in order to include additional elements, but only if those additional elements do not materially affect the basic and novel characteristics of the claimed features.

The terms "copolymer", "copolymerize" include not only polymers comprising two monomer residues and polymerization of two different monomers together respectively, but also includes copolymers comprising more than two monomer residues and polymerizing together more than two or more other monomers. Therefore the term copolymer, for example, includes terpolymer; quadrapolymer; and polymers made from more than four different monomers, and/or polymers comprising, consisting of, or consisting essentially of more than three different monomer residues.

The terms "middle distillate fuels" and "middle distillate fuels blended with biodiesel fuel" generally means a material that is liquid at 20° C. and one atmosphere pressure that can be made to react with oxygen so that it releases chemical energy as heat and/or to be used for work. Specifically, middle distillate fuel falls under the Grade No. 2-D for use in diesel engine applications with varying sulfur requirements (15 ppm sulfur maximum (S15)); 500 ppm sulfur maximum (S500); and 5000 ppm sulfur maximum (S5000). As per ASTM D975 standard, Grade No. 2 diesel fuel oils exhibit 90% distillation recovered temperatures (per ASTM D 86 test) of 282° C. (minimum) to 338° C. (maximum) and kinematic viscosity at 40 of 1.9 to 4.1 cSt. When a cloud point less than −12° C. is specified, as can occur during cold months, it is permitted and normal blending practice to combine Grade No. 2 with Grade No. 1 to meet the low temperature requirements. In that case the minimum viscosity at 40° C. shall be 1.7 cSt and the minimum 90% distillation recovered temperature shall be waived.

The terms "optional" or "optionally" mean subsequently described events or circumstances that may, but need not, occur, and that the description includes instances where the event or circumstance occurs and instances in which it does not.

The terms "significant" or "significantly" mean at least half, or 50%, by some measure as defined or as determined by context. For example, a solution that contains a "significant amount" of a component contains 50% or more of that component by weight, or by volume, or by some other measure as appropriate and in context. A solution having a component significantly removed has had at least 50% of the original amount of that component removed by weight, or by volume, or by some other measure as appropriate and in context.

The phrase "subjecting" a material "to a temperature of" means "conveying the material to a location wherein the material loses heat and the temperature of the material drops to a desired or predetermined temperature.

Reaction Product Components

Alkyl α-Olefins

One of the reaction product components described in this disclosure are α-olefins. In some embodiments the alpha olefin may be a $C_{10}$-$C_{40}$ alpha olefin or mixtures thereof. In some embodiments the α-olefin may be a $C_{10}$ to $C_{40}$ olefin or combination thereof, and may include a linear, branched, cyclic or a combination thereof. The olefin may be mono-, di, multi-olefin or a combination thereof.

In other embodiments, the alpha olefin is a mixture of $C_{20}$-$C_{24}$ alpha olefins. In other embodiments the alpha olefin may be one or more alpha olefins selected from the group consisting of an alpha olefin of formula (I)

$R_1$—CH=$H_2$ (I), wherein $R_1$ is $C_{10}$-$C_{14}$ alkyl; or an alkyl α-olefin of formula (II)

$R_2$—CH=$H_2$ (II), wherein $R_2$ is $C_{14}$-$C_{20}$ alkyl;

an alkyl α-olefin of the formula (III)

$R_3$—CH=$H_2$ (III), wherein $R_3$ is $C_{20}$-$C_{40}$ alkyl; and combinations thereof.

Suitable α-olefins impart side chains to the resulting polymer and are olefins with one double bond, since when polymerized olefins comprising one double bond per molecule do not usually form crosslinked networks. If the olefin is linear and/or contains linear hydrocarbon chains such as alkyl or alkaryl chains attached to the double bond, then polymers of the olefin including copolymers of the olefin have pendant side chains. For example, polymers of linear alpha olefins having 14 carbon atoms or more, when polymerized and/or copolymerized, impart linear side chains of 12 carbon atoms or more to the resulting polymer. Long-chain alkenes, wherein the double bond is not in the 1-position, are also suitable because when polymerized the resulting polymer of the alkene monomer has linear side chains of at least 12 carbon atoms. Polymers of long chain alkenes with 12 carbon atoms or more on one side of the double bond and 12 carbon atoms or more on the opposing side of the double bond, when polymerized and/or copolymerized, form brush polymers. Such brush polymers have sets of opposing pendant side chains. Brush and comb polymers are both useful in the disclosed embodiments.

Unsaturated Anhydrides

A second reaction component described in this disclosure is an unsaturated anhydride. In some embodiments the cyclic anhydride may be olefinic, cyclic anhydride, and may include 4-membered to 8-membered ring anhydride or a combination thereof. The olefin group may be on the ring or external to ring.

In other embodiments the unsaturated anhydride may be a one or more monomers selected from the group consisting of a monomer of formula (IV)

(IV)

wherein $R_1$ is hydrogen or $C_1$-$C_{12}$ alkyl; or a monomer of formula (V)

R2—O—CO—CH=C(R1)-CO—O—R3 (V)

wherein R1 is hydrogen or $C_1$-$C_{12}$ alkyl and $R_2$ and $R_3$ are the same or different and are $C_1$-$C_{18}$ alkyl.

In still other embodiments the unsaturated anhydride may be a maleic moiety such as, for example, maleic anhydride, maleic acid, maleimide and N-alkyl, N-aryl, and N-alkaryl maleimides. Other suitable unsaturated monomers may be a substituted moiety such as citraconic anhydride, citraconimide and N-alkyl, N-aryl, and N-alkaryl citraconimides. Still other suitable unsaturated monomers may be combinations of, for example, maleic anhydride and citraconic anhydride.

Phenyl Alkyl Alcohol or Alkyl Phenol Alkoxylate

A third reaction component described in this disclosure is an aromatic alcohol including, but not limited to, suitable phenyl alkyl alcohols, alkoxylated phenyl alkyl alcohols and alkoxylated phenoxides. In some embodiments this aromatic alcohol may be benzyl alcohol, 2-phenyl-1-propanol, phenylethanol, 3-phenylpropanol, substituted derivatives, or a combination thereof. In other embodiments, the aromatic alcohol may be ethoxylated alkyl phenol, propoxylated alkyl phenol, ethoxylated and propoxylated alkyl phenol, ethoxylated nonylphenol, ethoxylated octylphenol, phenolglycol, substituted derivatives, or a combination thereof.

In other embodiments, this component is an aromatic alcohol having the formula (VI)

$$(C_6H_5)-R_1OH \quad (VI)$$

wherein $R_1$ is $C_1$-$C_6$ linear or branched alkyl.

Fatty Alcohols

A fourth reaction component described in this disclosure is a fatty alcohol. In some embodiments the fatty alcohol can be C10 to C40, including a linear, branched, cyclic, or combinations thereof. The fatty alcohol may be an alkoxylated alcohol including, but not limited to, suitable ethoxylates and/or propoxylates, or a combination thereof.

In other embodiments, this component is a primary alcohol having the formula (VII)

$$R_1-CH_2OH \quad (VII)$$

wherein $R_1$ is $C_9$-$C_{39}$ linear, branched or cyclic alkyl.

Fatty Amine

A fifth reaction component described in this disclosure is a primary or secondary fatty amine including, but not limited to mixtures of primary and secondary amines. In some embodiments the fatty amine may be a $C_7$-$C_{40}$ amine or a combination thereof, including linear, branched, cyclic, aromatic or combinations thereof. In other embodiments, this component is a primary or secondary amine including, but not limited to mixtures of primary and secondary amines having the formula (VIII)

$$(R_1)(R_2)NH \quad (VIII)$$

wherein $R_1$ is $C_6$-$C_{30}$ linear, branched or cyclic alkyl and $R_2$ is hydrogen, $C_6$-$C_{30}$ linear, branched, or cyclic alkyl.

Reaction Product Component Ratios

The five components of the described reaction product may be combined in suitable molar ratios to provide a cloud point depressant. For example, the molar ratios of unsaturated anhydride (such as maleic anhydride)/alkyl α-olefin/fatty alcohol/aromatic alcohol/amine are 1.00/0.81/0.40/0.25/0.51. In other examples, the ratio of maleic anhydride/α-olefin may be in the range of 0.5/2.0 to 2.0/0.5 (may be done by a batch or semi-bath process to form a polymer backbone, including alternate, block, random copolymer or a combination thereof), the ratio of maleic anhydride/fatty alcohol may be in the range of about 10/0.1 to 1.0/1.9, the ratio of maleic anhydride/aromatic alcohol may be in the range of about 10/0.1 to 1.0/1.9, or the ratio of maleic anhydride/amine may be in the range of about 1.0/0.1 to 1.0/0.9.

Making the Reaction Product

Figure 1:
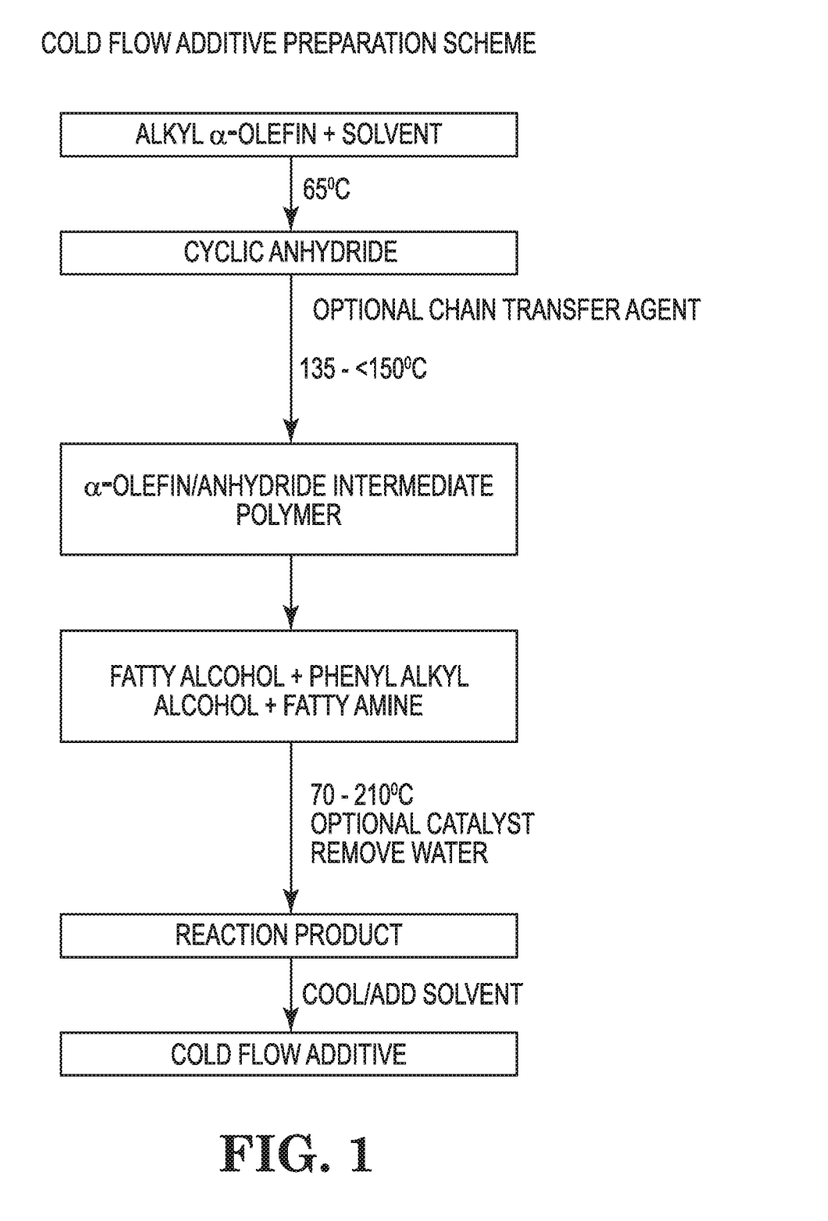
FIG. 1 illustrates a reaction scheme for the synthesis of a reaction product comprising an alkyl α-olefin, an unsaturated anhydride, a phenyl alkyl alcohol, a fatty alcohol, and a fatty amine that lowers cloud point temperatures.

The general reaction scheme to make the reaction product is illustrated in FIG. 1. Those skilled in the art will understand that obvious variants of this general scheme will provide the desired five component reaction product. Briefly, an alkyl α-olefin is added to a reactor and heat to about 150° C. for about one hour with a nitrogen purge to remove any water. The heated alkyl α-olefin is cooled to less than about 135° C. and optionally a heavy aromatic hydrocarbon (solvent) with or without a chain transfer agent is added followed by addition of an unsaturated anhydride. This mixture is then heated to about 135° C. and t-butyl perbenzoate is added portion-wise (2 to 5 portions in 50 wt % solvent) while controlling the reaction temperature at a temperature of less than about 150° C. by cooling, and then finally heated at about 135° C. for about 1-1.5 hours.

The intermediate product is cooled to about 70° C. and a phenyl alkyl alcohol or an alkyl phenol alkoxide, fatty alcohol and primary or secondary fatty amine are added with gradual heating from 70-210° C. for 2-10 hours until desired reaction product is provided.

Alternative Embodiments

Copolymers of maleic moieties with two or more olefins are disclosed, where the two or more olefins each furnishes to the resulting copolymer linear hydrocarbon sidechains of longer than 10 carbon atoms, the copolymers being effective as cloud point depressants when added to fuel, such as distillate fuels including diesel and biodiesel fuels. In further embodiments, the maleic moiety itself furnishes a further side chain of more than 10 carbons in length such as n-decyl: such maleic moieties include N-alkyl maleimides, wherein the alkyl group is n-alkyl having 12 carbon atoms or greater. In one embodiment, the maleic moiety is N-(n-octadecyl) maleimide.

Some embodiments provide a copolymer having at least three n-alkyl pendant chains having at least 10 carbon atoms, the copolymer comprising the residues of at least one maleic moiety having at least one maleic n-alkyl chain of at least 10 carbon atoms and the residue of at least two olefins comprising olefin n-alkyl chains having at least 10 carbon atoms. Each of the residues of the two or more olefins comprises a linear alkyl side-chain of 12 or more carbon atoms. At least two of the residues of the two or more olefins comprising a linear alkyl side-chain of 12 or more carbon atoms two or more olefins comprise linear alkyl side chains having chains each comprising at least 12 carbon atoms. In embodiments, the copolymer comprises, consists of, or consists essentially of the residues of one maleic moiety and two olefins. In embodiments, one or both of the two olefins is an alpha olefin. In embodiments, the maleic moiety is a maleimide. In embodiments, the monomer is an N-alkyl maleimide, wherein the alkyl group has more than 12 carbon atoms. In embodiments, the alkyl group is n-octadecyl. In embodiments, the long-chain carboxylic acid is a carboxylic acid having 12 carbon atoms or greater. A aromatic solvent may act as a chain transfer agent and therefore incorporate into the polymer.

Solvents

In embodiments, the cloud point depressant further comprises one or more hydrocarbon-based solvents. In embodiments, the solvent may be selected from alcohols, amides, sulfoxides, aldehydes, ketones, esters, or ethers. In embodiments, the solvent may be alicyclic or cyclic. In embodiments, the solvent may be aromatic. In other embodiments, the solvent may be selected from $C_1$-$C_{12}$ alkyl ethers, $C_1$-$C_{12}$ alcohols, $C_5$-$C_{18}$ linear alkanes, $C_5$-$C_{18}$ branched alkanes, $C_5$-$C_8$ cycloalkanes, toluene, o-xylene, m-xylene, p-xylene, refined petroleum solvent, ethylene glycol methyl butyl ether or any combination thereof. In still other embodiments the solvent may be heavy aromatic naphtha, refined petroleum solvent, xylene, toluene, kerosene, hydrotreated light distillate hydrocarbon, or middle distillate hydrocarbon. In some embodiments, an aromatic solvent may act as a chain transfer agent and would be incorporate in the polymeric reaction product.

Demulsifiers

In embodiments, a suitable demulsifier comprises a hydrophilic or maybe, for example, a water-soluble surfactant with a hydrophilic-lipophilic balance (HLB) values ≥about 8. An exemplary emulsifier is Nalco Champion EC2043A (Nalco Champion an Ecolab Company, St. Paul, Minn.).

Other Embodiments

The disclosed cloud point depressant provides improved low temperature stability when added to fuel at low temperatures. The disclosed cloud point depressant inhibits wax precipitation, crystallization and/or gelling from the fuel.

In embodiments, the number average molecular weight of the cloud point depressant of any of the disclosed embodiments is from about 1000-150000, from about 1000-15000, or about from 1000-10000.

In embodiments, the disclosed cloud point depressant is present in a composition at a concentration in a range of about 10-90, 15-85, 20-80, or 30-75 wt %.

Other embodiments are a method that comprises, consists of, or consists essentially of subjecting a fuel composition comprising a disclosed cloud point depressant to a cold temperature.

FIG. 1 illustrates a reaction scheme that provides the disclosed cloud point depressant. In first step, substantially equimolar amounts of a suitable alpha olefin and suitable maleic moiety are charged to a reactor under an inert atmosphere and heated to provide a homogeneous mixture. The homogeneous mixture is heated to a desired reaction temperature with mixing and then a suitable initiator is added portion-wise to the mixture to initiate the copolymerization reaction.

In a second step, the alpha olefin/malic moiety copolymer is heated to a desired temperature, and a suitable amount of a phenyl alkyl alcohol, fatty alcohol and primary or secondary fatty amine are added with heated and removal of water to provide the desired reaction product.

The alpha olefin/maleic moiety/phenyl alkyl alcohol/fatty alcohol/fatty amine reaction product formed in the second step is then mixed with a suitable solvent, and optionally a demulsifier, to form a cloud point depressant that may be added to a distillate fuel such as diesel, biodiesel, or blends of diesel and biodiesel.

EXAMPLES

Example 1. Method Making a Reaction Product

The listed components set out below were added to a reactor as described to provide the disclosed reaction product of an alkyl α-olefin, unsaturated anhydride, phenyl alkyl alcohol, fatty alcohol and fatty amine.

| Components | Wt. % | Wt. (Kg) |
|---|---|---|
| $C_{20}+$ α-olefin | 20.89 | 10.68 |
| Aromatic Naptha | 20.00 | 10.22 |
| Maleic Anhydride | 8.37 | 4.28 |
| t-Butyl Perbenzoate | 0.18 | 0.09 |
| Aromatic Naptha | 0.18 | 0.09 |
| t-Butyl Perbenzoate | 0.18 | 0.09 |
| Aromatic Naptha | 0.18 | 0.09 |
| t-Butyl Perbenzoate | 0.18 | 0.09 |
| Aromatic Naptha | 0.18 | 0.09 |
| t-Butyl Perbenzoate | 0.18 | 0.09 |
| Aromatic Naptha | 0.18 | 0.09 |
| t-Butyl Perbenzoate | 0.18 | 0.09 |
| Aromatic Naptha | 0.18 | 0.09 |
| BnOH | 2.28 | 1.17 |
| $C_{14}OH$ | 7.35 | 3.76 |
| PHT, $C_{12}$-$C_{18}$ Amines | 11.10 | 5.67 |
| Aromatic Naptha | 28.21 | 14.24 |
|  | 100 | 51.12 |

A heated (not less than 65° C.) nitrogen purged and blanketed reaction vessel is charged with alkyl α-olefin followed by solvent. The mixture is then heated to about 135° C. and mixed for about 30 minutes. A first portion of t-butyl perbenzoate in solvent is added to the mixture maintaining the temperature below about 150° C. and then subsequent portions of perbenzoate in solvent are added stepwise (total 5 portions added). This mixture in the mixed for about 90 minutes at 135° C.

The remaining components are added sequentially in order: benzyl alcohol, $C_{14}$ fatty alcohol and $C_{12-18}$ fatty amine followed by additional solvent. This mixture is heated at about 145-195° C. for about 4 hours and then cooled and filtered to provide the disclosed reaction product.

Example 2: Identification of a Reaction Product

Figure 2:
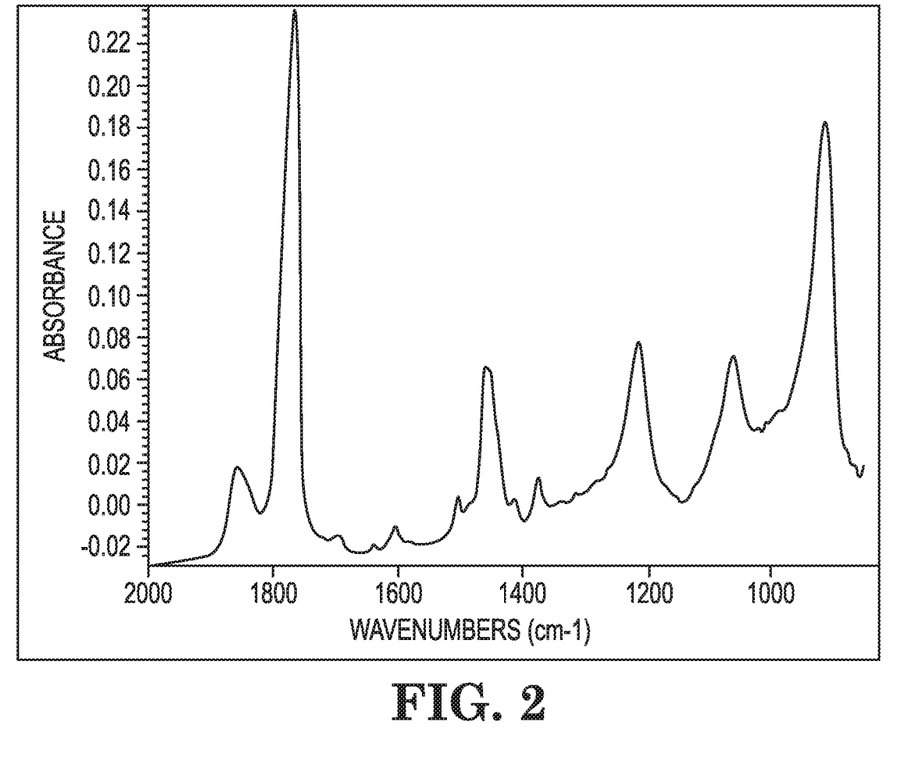
FIG. 2 illustrates a Fourier transform infrared (FTIR) spectrum of an intermediate α-olefin/unsaturated anhydride product described in this disclosure.
Figure 3:
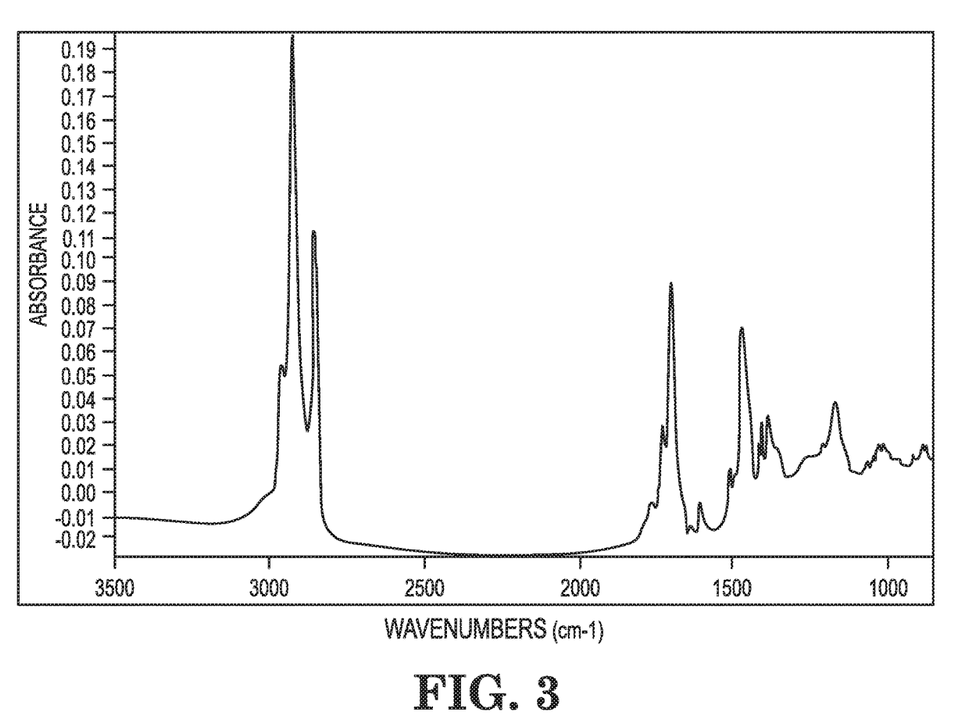
FIG. 3 illustrates a FTIR spectrum of a reaction product described in this disclosure.

The IR spectrum of an intermediate product of an alkyl α-olefin and an unsaturated anhydride and a reaction product of this intermediate product comprising a phenyl alkyl alcohol, a fatty alcohol and a fatty amine are illustrated in FIGS. 2 and 3.

On the intermediate spectrum FIG. 2, the pair of characteristic asymmetric and symmetric anhydride stretch bands are at 1860 and 1779 cm-1. On the reaction product spectrum FIG. 3, the pair of anhydride stretch bands disappears and the new pair of characteristic asymmetric and symmetric imide stretch bands appears at 1773 and 1705 cm-1 with a new ester characteristic band at 1732 cm-1. On the lower frequency side (below 1300 cm-1) of the spectrum, notably the anhydride C—O stretch bands for the OMAC intermediate disappear and C—O ester stretch bands appear on the product spectrum. On the product spectrum, there is a band at 1403 cm-1 is corresponding to a characteristic imide C—N stretch. For both spectra, there is a band at 1461-1462 corresponding to $CH_2$ bending absorption. Please note that no intention was made to remove the solvent, heavy aromatic hydrocarbon, so the solvent absorption bands should be part of both spectra.

The $^{13}C$ NMR spectra and the GPC data for a reaction product of this disclosure are set out in Tables 1 and 2 below.

Table 1. $^{13}C$ NMR

TABLE 1

|  |  | NMR analysis* | | |
|---|---|---|---|---|
|  | Cold Flow Additive | | Mol | Residual |
| Components | Wt % | Mol ratio | ratio charged | Wt % calculated |
| $C_{20}$-$C_{24}$ α-olefin | 20.8911% | 0.8080 |  | 3.21% |
| Maleic anhydride | 8.3673% | 1.0000 | 1.000 | Not detected |
| t-Butyl perbenzoate | 1.0709% |  |  |  |
| Heavy aromatic naphtha | 48.9291% |  |  |  |
| Benzyl alcohol | 2.2884% | 0.2480 | 0.297 | 0.82% |
| Myristyl alcohol ($C_{14}$ alcohol) | 7.3541% | 0.4020 | 0.464 | 1.65% |
| Mono-hydrogenated tallow alkyl-amine ($C_{12}$-$C_{18}$ amine) | 11.0992% | 0.5058 |  | Not detected |

*$^{13}C$ NMR analysis in deuterated chloroform

TABLE 2

Table 2. GPC

| Sample ID | Description | Mw (weight average molecular weight) Daltons | Mn (number average molecular weight) Daltons | Polydispersity |
|---|---|---|---|---|
| Cold Flow Additive | Final product (five reagent product), modified poly(maleic anhydride-$C_{20\text{-}24}$ α-olefin,) with benzyl alcohol, $C_{14}$ alcohol, and $C_{12}\text{-}C_{18}$ amine | 7784 | 4424 | 1.76 |
| Reaction Product | Intermediate copolymer, poly(maleic anhydride, $C_{20\text{-}24}$ α-olefin) | 5755 | 3301 | 1.74 |

Conditions: Columns - Styragel Guard + HR4 + HR3 + ultraStyragel 500A,
Mobile Phase - THF/3% Acetic Acid, and
Standards - polystyrene Example 3: Cloud Point Depressant and Comparative Samples Reaction products as described in this disclosure were prepared and tested for cloud point depression characteristics and properties using known analytical processes and procedures in Fuels A, B, C, D and E. The reaction product samples listed in Tables 3, 4 and 5 and the resulting cloud point depression values graphically illustrated in FIGS. 4, 5, 6 and 7 demonstrated the cold flow properties of the reaction products of this disclosure.

TABLE 3*

Fuels A, B and C

Figure 4:
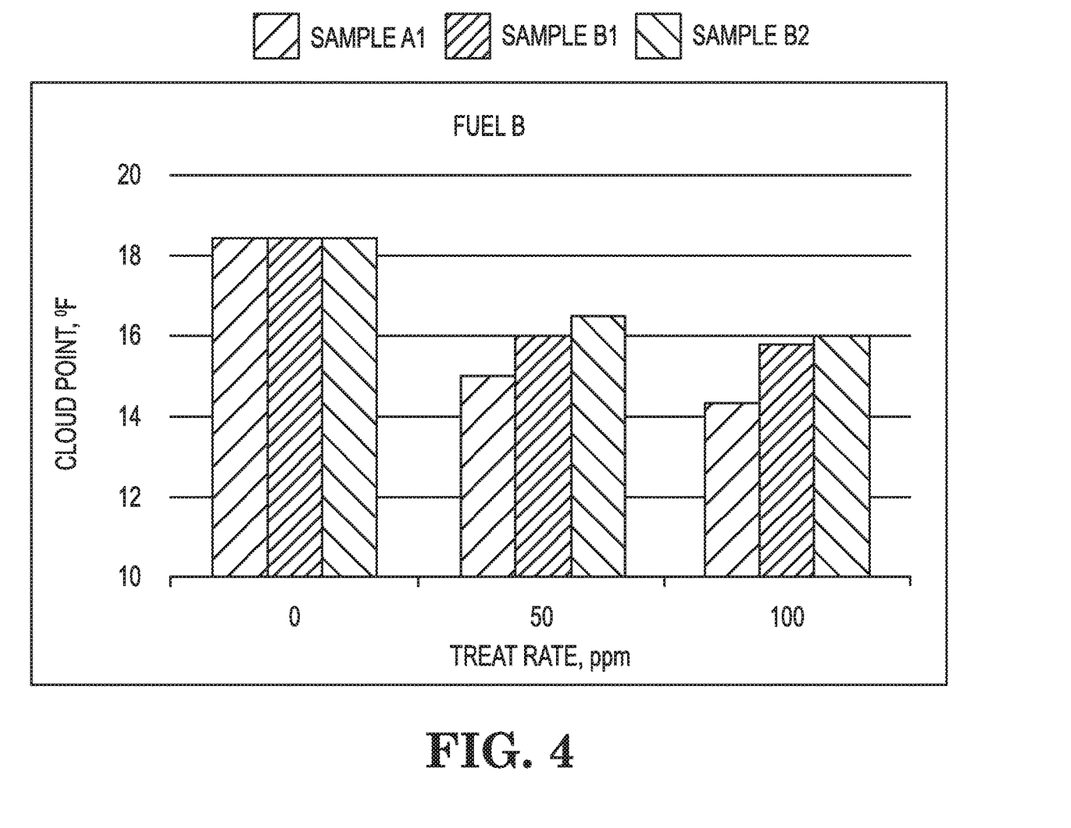
FIGS. 4-7 are graphical illustrations of cloud point depression using a reaction product described in this disclosure.
Figure 5:
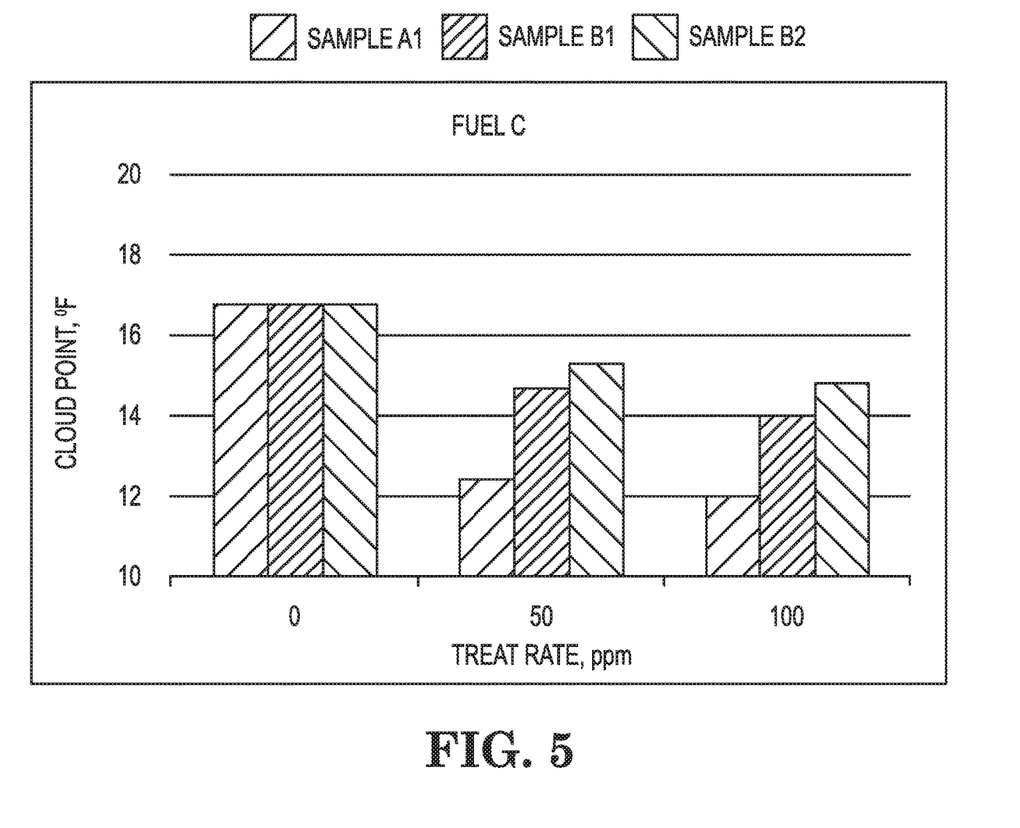

| SAMPLE | Actives at 50 ppm | Fuel A CP (° F.) | Fuels B and C CP (° F.) |
|---|---|---|---|
| Control | No additive | 13.2 | FIGS. 4 and 5 |
| A1 | Poly(maleic anhydride-α-olefin, $C_{20}\text{-}C_{24}$) modified with $C_{14}OH/HCOH/C_{16}\text{-}C_{18}NH_2$ | 10.5 | FIGS. 4 and 5 |

*HCOH—hydrocinnamic alcohol

TABLE 4*

Fuels A, B and C

| SAMPLE | Actives at 50 ppm | Fuel A CP (° F.) | Fuels B and C CP (° F.) |
|---|---|---|---|
| Control | No additive | 13.2 | FIGS. 4 and 5 |
| B1 | Poly(maleic anhydride-α-olefin, $C_{20}\text{-}C_{24}$) modified with $C_{16}\text{-}C_{18}NH_2$/PEA | 9.0 | FIGS. 4 and 5 |
| B2 | Poly(maleic anhydride-α-olefin, $C_{20}\text{-}C_{24}$), 0.61% Chain transfer agent, modified with $C_{14}OH/HCOH$ with 0.32% $H_2SO_4$ | 9.7 | FIGS. 4 and 5 |

*Chain transfer agent - dibutyl phosphite; HCOH—hydrocinnamic alcohol; PEA—phenylethylamine

TABLE 5*

Fuels D and E

Figure 6:
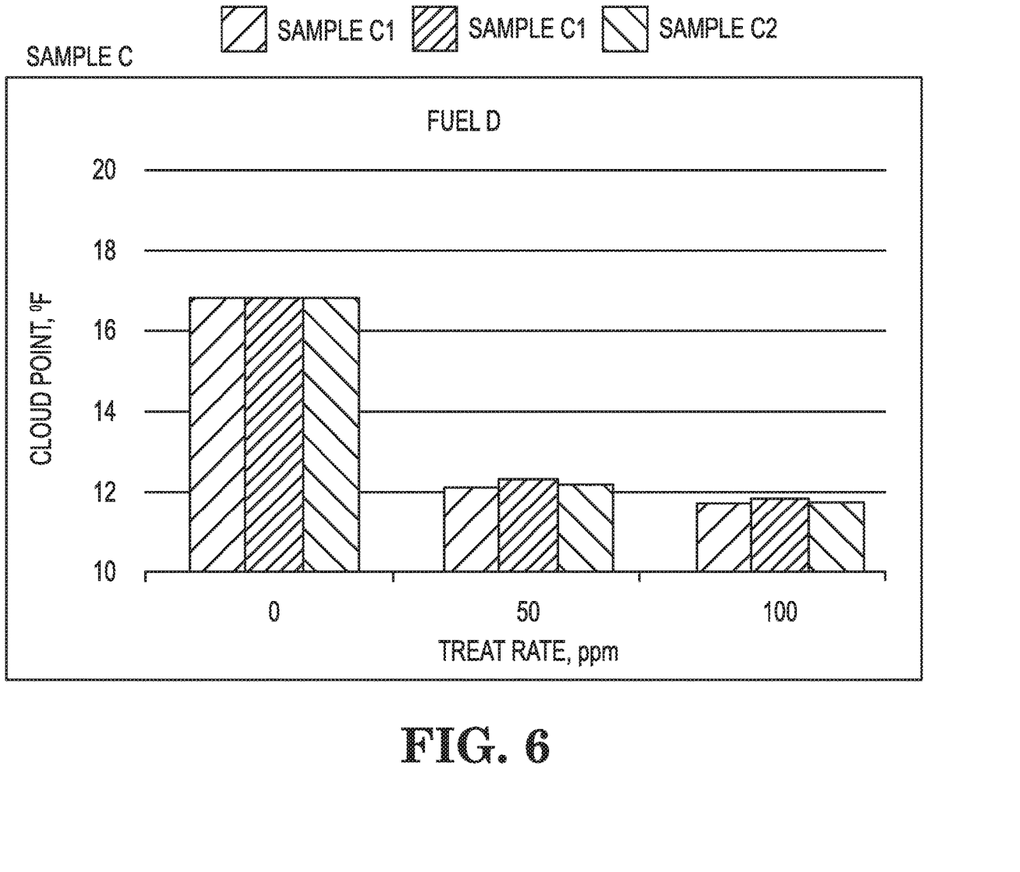
Figure 7:
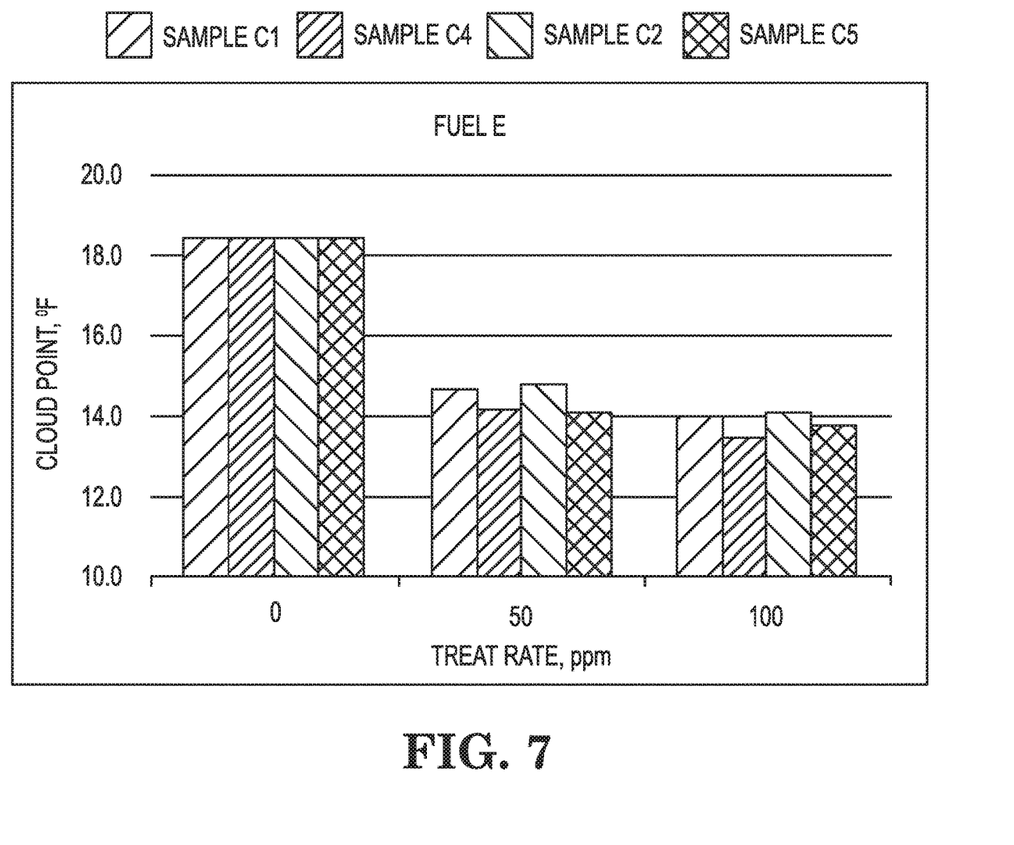

| SAMPLE | Actives at 50 ppm | CP (° F.) |
|---|---|---|
| Control | Untreated | FIGS. 6 and 7 |
| C1 | Poly(maleic anhydride-α-olefin, $C_{20}\text{-}C_{24}$) modified with $C_{14}OH/BnOH/C_{16}\text{-}C_{18}NH_2$ | FIGS. 6 and 7 |

TABLE 5*-continued

Fuels D and E

| SAMPLE | Actives at 50 ppm | CP (° F.) |
|---|---|---|
| C2 | Poly(maleic anhydride-α-olefin, $C_{20}\text{-}C_{24}$) modified with $C_{14}OH/NP\text{-}EO/C_{16}\text{-}C_{18}NH_2$ | FIGS. 6 and 7 |
| C3 | Poly(maleic anhydride-α-olefin, $C_{20}\text{-}C_{24}$) modified with $C_{14}OH/PhG/C_{16}\text{-}C_{18}NH_2$ | FIG. 6 |
| C4 | Poly(maleic anhydride-α-olefin, $C_{20}\text{-}C_{24}$) modified with $C_{14}OH/BnOH/$ hydrogenated tallow alkyl amines | FIG. 7 |
| C5 | Poly(maleic anhydride-α-olefin, $C_{20}\text{-}C_{24}$) modified with $C_{14}OH/NP\text{-}EO/$ hydrogenated tallow alkyl amines | FIG. 7 |

*BnOH—benzyl alcohol; NP—EO—ethoxylated nonylphenol; PhG—phenylglycol

The invention claimed is:

1. A cold flow additive for middle distillate fuel comprising a solvent and a reaction product that lowers cloud point temperatures, the reaction product consisting essentially of the reaction of an alkyl α-olefin, an unsaturated anhydride, a phenyl alkyl alcohol or an alkyl phenol alkoxylate, a fatty alcohol, and a primary or secondary fatty amine having a ratio of unsaturated anhydride/α-olefin in the range of 0.5/2 to 2/0.5, a ratio of unsaturated anhydride/fatty alcohol in the range of about 10/1 tot/1.9, a ratio of unsaturated anhydride/aromatic alcohol in the range of about 10/1 to 1/1.9, or a ratio of maleic anhydride/amine in the range of about 1/0.1 to 1/0.9.

2. The cold flow additive of claim 1, wherein the alkyl α-olefin is a $C_{10}\text{-}C_{40}$ α-olefin, a $C_{10}\text{-}C_{30}$ α-olefin, a $C_{20+}$ α-olefin, or combinations thereof.

3. The cold flow additive of claim 1, wherein the unsaturated anhydride is maleic anhydride, six-membered cyclic anhydride, seven-member cyclic anhydride, or combinations thereof.

4. The cold flow additive of claim 1, wherein the phenyl alkyl alcohol is benzyl alcohol, 2-phenyl-1-propanol, 3-phenyl-1-propanol, 2-phenyl ethanol, or combinations thereof and the alkyl phenol alkoxylate is ethoxylated alkyl phenol, propoxylated alkyl phenol, ethoxylated and propoxylated alkyl phenol, ethoxylated nonylphenol, ethoxylated octylphenol, phenolglycol, or combinations thereof.

5. The cold flow additive of claim 1, wherein the fatty alcohol is $C_{10}\text{-}C_{40}OH$, $C_{10}\text{-}C_{30}OH$, $C_{12}\text{-}C_{18}OH$, $C_{14}OH$, or combinations thereof.

6. The cold flow additive of claim 1, wherein the primary or secondary fatty amine is $C_{10}\text{-}C_{30}$ fatty amines, $C_6\text{-}C_{30}$ aromatic amines, a mixture of $C_{12}\text{-}C_{18}$ amines, or combinations thereof.

7. The cold flow additive of claim 1, wherein the solvent is heavy aromatic naphtha, refined petroleum solvent, xylene, toluene, kerosene, hydrotreated light distillate hydrocarbon, middle distillate hydrocarbon, or combinations thereof.

8. The cold flow additive of claim 1 comprising a solvent, and the reaction product of a $C_{20+}$ α-olefin, maleic anhydride, benzyl alcohol, $C_{14}OH$, and a mixture of $C_{12}$-$C_{18}$ primary or secondary amines.

9. A reaction product prepared by a process comprising heating a mixture of an α-olefin and an unsaturated anhydride in a solvent to form an intermediate polymer, contacting the intermediate polymer with a phenyl alkyl alcohol or an alkyl phenol alkoxylate, a fatty alcohol and a primary or secondary fatty amine to form the reaction product wherein the reaction product has a ratio of unsaturated anhydride/α-olefin in the range of 0.5/2 to 2/0.5, a ratio of unsaturated anhydride/fatty alcohol in the range of about 10/1 tot/1.9, a ratio of unsaturated anhydride/aromatic alcohol in the range of about 10/1 to 1/1.9, or a ratio of maleic anhydride/amine in the range of about 1/0.1 to 1/0.9.

10. The reaction product of claim 9, wherein the solvent is heavy aromatic naphtha, the alkyl α-olefin is $C_{20+}$ α-olefin, the cyclic anhydride is maleic anhydride, the phenyl alkyl alcohol, is benzyl alcohol, the fatty alcohol is $C_{14}OH$, and a mixture of $C_{12}$-$C_{18}$ primary or secondary amines.

11. A process of preparing a cold flow additive reaction product comprising the steps of heating a mixture of an alkyl α-olefin and an unsaturated anhydride in an optional solvent to form an intermediate polymer, contacting the intermediate polymer with a mixture of a phenyl alkyl alcohol or an alkyl phenol alkoxylate, a fatty alcohol, and a primary or secondary fatty amine to form an intermediate mixture, and heating the intermediate mixture to form the reaction product, wherein the reaction product has a ratio of unsaturated anhydride/α-olefin in the range of 0.5/2 to 2/0.5, a ratio of unsaturated anhydride/fatty alcohol in the range of about 10/1 tot/1.9, a ratio of unsaturated anhydride/aromatic alcohol in the range of about 10/1 to 1/1.9, or a ratio of maleic anhydride/amine in the range of about 1/0.1 to 1/0.9.

12. The process of claim 11, wherein the alkyl α-olefin and unsaturated anhydride are heated in the presence of an initiator.

13. The process of claim 12, wherein the initiator is t-butyl peroxybenzoate.

14. The process of claim 11, wherein the mixture of alkyl α-olefin and unsaturated anhydride are heated to a temperature of about 135° C. for about 2-3 hours while adding the initiator and maintaining a temperature of less than 150° C.

15. The process of claim 11 further comprising the steps of cooling the reaction product and adding solvent to the cooled reaction product to form a cold flow additive for middle distillate fuel.

16. The process of claim 11, wherein the solvent is heavy aromatic naphtha, the alkyl α-olefin is $C_{20}$+α-olefin, the unsaturated anhydride is maleic anhydride, the phenyl alkyl alcohol is benzyl alcohol, the fatty alcohol is $C_{14}OH$, and the primary or secondary fatty amine is mixture of $C_{12}$-$C_{18}$ amines.

17. A cold flow additive comprising the reaction product of claim 1 having molar ratios of unsaturated anhydride/alkyl α-olefin/fatty alcohol/phenyl alkyl alcohol/fatty amine of about 1.00/0.81/0.40/0.25/0.51.

18. A cold flow additive comprising the reaction product of claim 17 and added solvent.

19. The cold flow additive of claim 18 comprising 48.75 wt % solvent, 20 wt % alkyl α-olefin, 8.37 wt % cyclic anhydride, 2.28 wt % phenyl alkyl alcohol, 7.35 fatty alcohol and 11.10 wt % fatty amine.

* * * * *

UNITED STATES PATENT AND TRADEMARK OFFICE
CERTIFICATE OF CORRECTION

PATENT NO. : 11,118,126 B2
APPLICATION NO. : 16/506049
DATED : September 14, 2021
INVENTOR(S) : Xiaojin Harry Li, Nestor U. Soriano, Jr. and Heinrich Enoch Bod Page 1 of 1

It is certified that error appears in the above-identified patent and that said Letters Patent is hereby corrected as shown below:

In the Claims

Column 12, Claim 1, Line 43, "tot/1.9," should be --to 1/1.9,--, therefor.

Column 12, Claim 2, Lines 48-49, "$C_{20+}\alpha$-olefin," should be --$C_{20+}$ $\alpha$-olefin,--, therefor.

Column 13, Claim 8, Line 7, "$C_{20+}\alpha$-olefin," should be --$C_{20+}$ $\alpha$-olefin,--, therefor.

Column 13, Claim 9, Line 18, "tot/1.9," should be --to 1/1.9,--, therefor.

Column 13, Claim 10, Lines 23-24, "$C_{20+}\alpha$-olefin," should be --$C_{20+}$ $\alpha$-olefin,--, therefor.

Column 14, Claim 11, Line 3, "tot/1.9," should be --to 1/1.9,--, therefor.

Column 14, Claim 16, Line 20, "$C_{20}+\alpha$-olefin," should be --$C_{20}+$ $\alpha$-olefin,--, therefor.

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*